(No Model.)  
2 Sheets—Sheet 1.

F. W. VOERDE.
SAFETY ATTACHMENT FOR ELEVATORS.

No. 262,862. Patented Aug. 15, 1882.

Witnesses:  
William A. Singer  
Albert H. Adams

Inventor:  
Frederick W. Voerde (No Model.) 2 Sheets—Sheet 2.
F. W. VOERDE.
SAFETY ATTACHMENT FOR ELEVATORS.
No. 262,862. Patented Aug. 15, 1882.

Witnesses:
William A. Singer
Albert H. Adams

Inventor:
Fredrick W. Voerde

UNITED STATES PATENT OFFICE.

FREDERICK W. VOERDE, OF CHICAGO, ILLINOIS, ASSIGNOR TO PETER J. SINGER, OF SAME PLACE.

SAFETY ATTACHMENT FOR ELEVATORS.

SPECIFICATION forming part of Letters Patent No. 262,862, dated August 15, 1882.

Application filed May 22, 1882. (No model.)

*To all whom it may concern:*

Be it known that I, FREDERICK W. VOERDE, residing at Chicago, in the county of Cook and State of Illinois, and a citizen of the United States, have invented a new and useful Improvement in Safety Attachments for Elevators, of which the following is a full description, reference being had to the accompanying drawings, in which—

Figure 1:
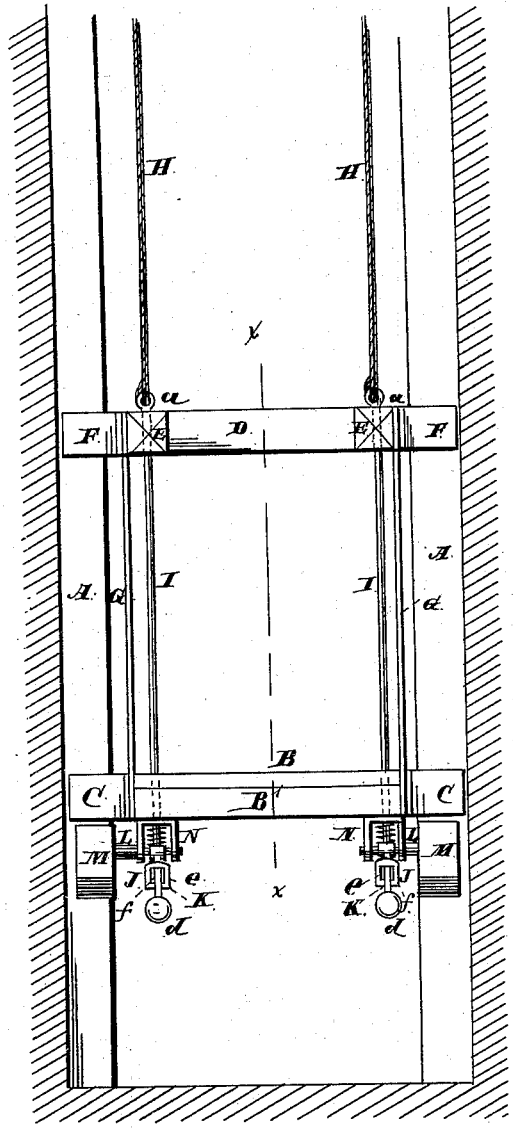
Figure 2:
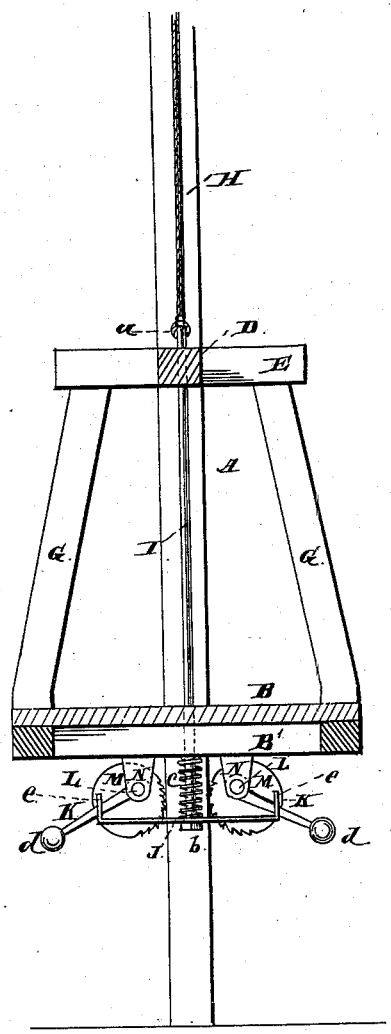
Figure 3:
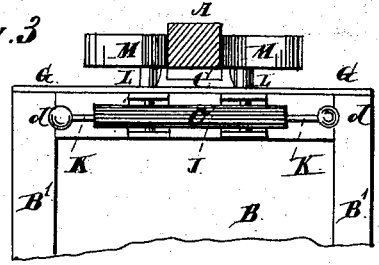
Figure 4:
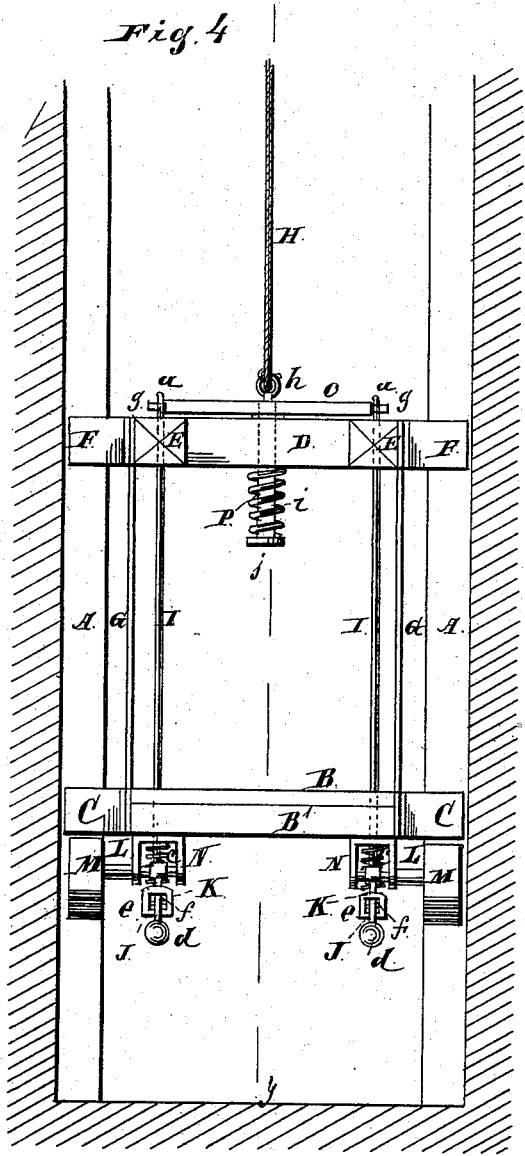
Figure 5:
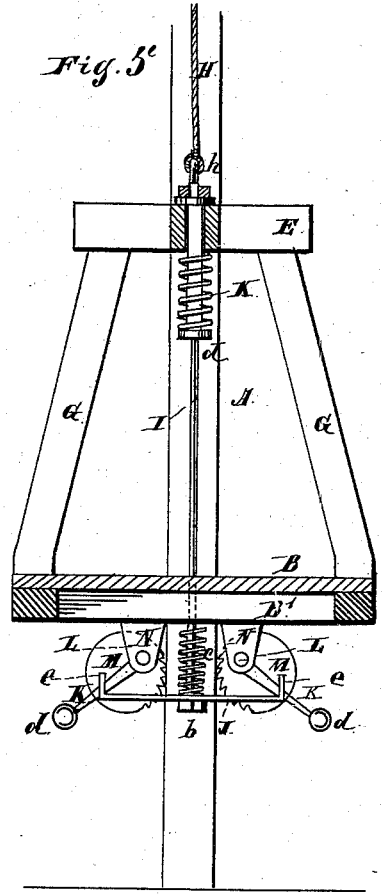

Figure 1 is a side elevation, showing a cage or platform with the safety attachment in connection with two hoisting-cables; Fig. 2, a vertical cross-section on line $xx$ of Fig. 1; Fig. 3, a detail showing an under side view of a portion of the platform with the safety attachment, and showing the guide rail or bar in section; Fig. 4, a side elevation of a cage or platform, showing the safety attachment in connection with a single cable; and Fig. 5, a vertical cross-section on line $yy$ of Fig. 4.

This invention relates to safety attachments to be applied to elevators for stopping the descent of the platform or cage in case the cable breaks or other cause, and has for its object to construct and apply a safety attachment that will be non-acting when the cable is taut and working properly, but will automatically act to stop the cage or platform in case of breakage of the cable, or in case the cable becomes slack or from other cause becomes inoperative, and which will perform the required work in an efficient and reliable manner, and will always be ready for use when occasion requires; and its nature consists in providing a lifting or supporting bar arranged on the cage or platform and acting to support the clutching devices and connected with the hoisting-cable so as to be controlled thereby; in providing a retaining or supporting bar, arms or levers, rock-shafts, and eccentrics for holding the eccentrics clear of the guide rails or bars or forcing them into engagement therewith; in providing a retaining or supporting bar, arms or levers, rock-shafts, eccentrics, connecting rods or links for connecting the retaining or supporting bar with the hoisting-cable, and in the several parts and combinations of parts hereinafter described and claimed as new.

In the drawings, A represents the guide rails or bars; B, the bottom of the cage or platform supported upon a suitable frame-work, B'; C, forks or guides attached one to each end of the bottom and straddling or forking the guide-rails for holding the cage or platform in operative position; D, the upper bar of the cage or platform; E, end bars secured one to each end of the bar D; F, forks or guides located on the outer face of each end bar E, and corresponding to the forks or guides C; G, brace-bars uniting the upper and lower portions of the cage or platform. These parts, represented by the letters A, B, B', C, D, E, F, and G, may be of the form of construction and arrangement shown, or of such other form of construction and arrangement as may be desired.

H is the hoisting cable or cables of the usual construction and arrangement, operating in the usual manner.

I represents sliding rods or links, two on each end of the cage or platform, passing through the end bars, D, and the bottom B B', and having at their upper ends an eye or loop, $a$, to which the hoisting-cables, when two are used, as shown in Figs. 1 and 2, are directly attached. The lower end of each rod or link extends below the bottom, and is screw-threaded to receive a nut, $b$.

J is a retaining or supporting bar, one for each rod or link I. The lower end of the link passes through its bar J, and the bar is held from dropping off by the nut $b$, and between the upper face of the bar and the end bar of the frame-bottom, in the form of construction shown, is a coiled spring, $c$, which spring is located around the rod or link, and acts in a downward direction. This spring $c$ should be of sufficient force to throw the bar J down, and at the same time is compressible under the draw of the hoisting-cable and the weight of the cage or platform, so as to allow the bar J to rise. The ends of each bar J is turned up to form ears or projections $e$, in each of which is a slot or opening, $f$, as shown.

K are arms or levers. As shown, four are provided, two for each end of the cage or platform, arranged on each side of the guide-rail. These arms or levers pass through the slots or openings $f$ in the ears $e$, so as to be supported by the cross-bar J, and, as shown, their outer or free ends are provided with a ball or weight, d.

L are shafts or rods supported, as shown, below the bottom of the cage or platform, to which the inner ends of the arms or levers K are attached. As shown, four shafts or rods are provided, one for each arm or lever. The inner ends of the arms or levers may be connected to their respective shaft or rod, so that their outer ends can be adjusted; but the connection should be of such nature that when the arms are properly adjusted the shafts and arms will be firmly connected together.

M are eccentrics, one located on the outer end of each shaft or rod L, bringing two eccentrics on each end of the platform or cage, and these eccentrics are arranged in such relation to the guide rails or bars and the arms or levers as that when the arms or levers are elevated or raised the eccentrics will clear the guide-rails; but when the arms or levers are thrown down or depressed the eccentrics will be brought into contact or engagement with the face of the guide-rail. As shown, the eccentrics at the point where the engagement is made with the guide-rail are provided with a serrated face, so as to insure a firmer and stronger hold.

N are depending brackets or ears, in which the rock-shafts or rods L have their bearing. These brackets are attached to the end pieces of the bottom frame, as shown, and in the form of construction and arrangement shown the inner ends of the arms or levers are located on the shafts or rods between the hangers. The shafts could be supported in some other manner and by other means than the hangers, if desired.

When two cables are used a cable is attached to the eye or loop $a$ at the upper end of each rod or link I, and the strain or pull on such cables will draw the rod I up, raising the bars J, and through these bars raising the levers or arms L on each end and side, throwing the eccentrics clear of the guide-rails, so that the cage is free to travel up and down; but in case a cable breaks the strain or force which holds the bar J in its elevated position is released, and the spring $c$ acts and throws such bar down, carrying with it the arms or levers K, turning the shafts or rods L, and bringing or forcing the eccentrics M on each side into contact with or engagement with the face of the guide rail or bar A, which stops the descent of the cage or platform. This would be the case in the event of the breaking of one cable while the other one holds; but in the event both cables break both sets of clutching devices would be thrown into engagement, as just described. When a single hoisting-cable is used a bar, O, may be provided, having at each end a gudgeon or pin, $g$, to enter the eye or loop of the rods I, and having at its center a depending bar, P, the upper end of which passes through the bar O, and is provided with a ring or eye, $h$, to which the end of the hoisting-cable is attached, or the ring or eye might be attached to the bar O. The bar P passes through the beam D, and extends some distance below such beam, and its lower end is provided with a disk or plate, $j$, between which and the face of the beam D, and around the bar P, is a coil-spring, $i$, which spring should be sufficiently strong to throw the bar down, carrying with it the bar O, and at the same time should be sufficiently yielding to permit the strain or draw of the hoisting-cable to overcome its resistance to raise the bars O P, raising the links or rods I, holding the eccentrics clear of the guide-rails, as before described. The operation of this form of construction is the same as described where two hoisting-cables are used. When the hoisting-cable is working properly the bars O P will be held elevated, raising the rods or links I and the retaining or supporting bars J, keeping the arms or levers elevated, and throwing the eccentrics clear of the guide-rails; but in case the cable breaks the spring $i$ acts and throws the bars O P down, carrying with them the links or rods I, depressing the arms or levers K, forcing the eccentrics M into engagement or contact with the guide-rails, and stopping the descent of the cage or platform.

As shown, the supporting or retaining bars, arms, or levers, rock-shafts, and eccentrics are arranged below the bottom of the cage or platform; but they might be arranged below the upper frame-work, D E, and work equally as well, the only change required being to shorten the links I accordingly. When located or arranged on the upper frame-work, D E, the devices are to be arranged so as to leave a sufficient space for the raising of the bars J to hold the eccentrics out of use.

The arms or levers K, as shown, are provided on their outer ends with balls or weights $d$ to assist in throwing them down; but it is evident that these balls or weights could be omitted and the force of the spring $c$ be depended on for this purpose, or that springs could be arranged to bear on top of the arms or levers or to draw on their under side and take the place of the balls or weights.

The arrangement of the bars O P can be varied to suit the cage or platform with which the device is used.

As shown, a double set of eccentrics, one set for each guide rail or bar, is provided, with a rock-shaft and arm or lever for each eccentric; but it is evident that one set of eccentrics could be used, working in connection with sliding guides on the opposite side of the guide-rail, and perform the work of stopping the descent of the cage or platform, with good results; but by using two sets the stoppage is insured with more certainty.

As shown, when two cables are used they are connected one to each rod or link; but it is evident that the cross-bar O, with its depending bar P, could be used, the cables in such case being suitably connected one at each end of the bar O.

Instead of turning the ends of the bars P, loops or eyes of some other form could be used for holding the arms or levers.

What I claim as new, and desire to secure by Letters Patent, is—

1. A supporting or retaining bar having a vertical movement, and adapted to operate a clutching mechanism, substantially as specified.

2. The combination of a suspending or retaining bar with arms or levers, rock-shafts, eccentrics, and a connection between the suspending or retaining bar and the hoisting cable or cables, substantially as and for the purposes specified.

3. A clutch mechanism consisting of a suspending or retaining bar, arms or levers, rock-shafts, and eccentrics adapted to be attached to an elevator cage or platform, and connected with a hoisting-cable, substantially as and for the purposes specified.

4. The combination of a suspending or retaining bar, arms or levers, rock-shafts, and eccentrics with a rod or link and a hoisting-cable, substantially as and for the purposes specified.

5. The combination of a retaining or supporting bar, arms or levers, rock-shafts, and eccentrics with a rod or link and return-spring around the rod or link and a hoisting-cable, substantially as and for the purposes specified.

6. The combination of the suspending or retaining bars J, the arms or levers K, rock-shafts L, hangers N, and eccentrics M, with the rods or links I, spring $c$, and hoisting-cables H, substantially as and for the purposes specified.

7. The combination of the suspending or retaining bars J, arms or levers K, rock-shafts L, hangers N, and eccentrics M with the rods or links I, springs $c$, bars O P, spring $i$, and hoisting-cable H, substantially as and for the purposes specified.

FREDERICK W. VOERDE.

Witnesses:
ALBERT H. ADAMS,
WILLIAM A. SINGER.